March 7, 1944.    H. C. GILLESPIE    2,343,453
ELECTRICAL HEATING APPARATUS
Filed May 30, 1942
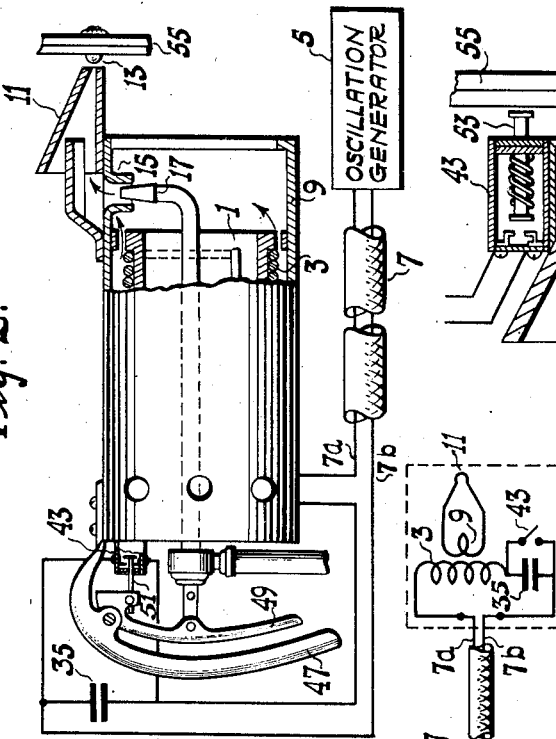
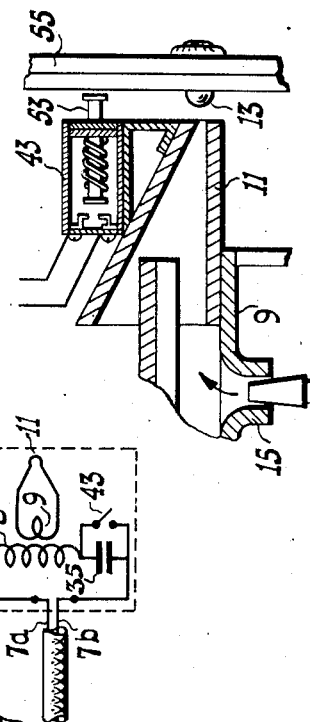
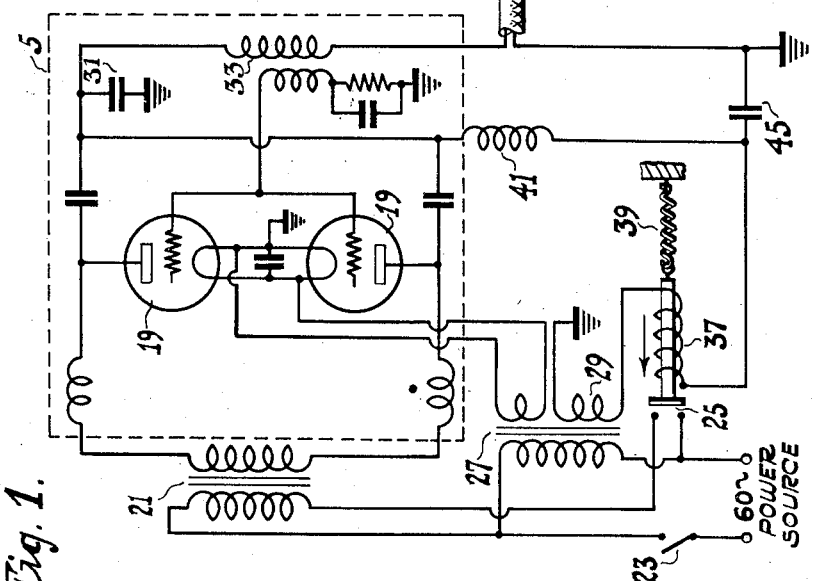
INVENTOR.
Henderson C. Gillespie
BY
ATTORNEY.

Patented Mar. 7, 1944

2,343,453

UNITED STATES PATENT OFFICE 2,343,453

ELECTRICAL HEATING APPARATUS

Henderson C. Gillespie, Moorestown, N. J., assignor to Radio Corporation of America, a corporation of Delaware Application May 30, 1942, Serial No. 445,182

12 Claims. (Cl. 219—13)

This invention relates to a heating device, and more particularly to a device for heating conductive articles by induction from a source of electrical energy of high frequency, the present invention being directed to the type of heating device disclosed in my copending application Serial No. 420,956, filed November 29, 1941, now Patent No. 2,314,875, granted March 30, 1943, and being particularly directed to the control means for controlling the supply of energy from the high frequency energy source to the coupling coil.

In the aforesaid application, there is disclosed a heating device adapted for local rapid heating in many industrial applications. This device comprises a single-turn coupling coil which is coupled to a high frequency oscillation generator through a step-down transformer, the coupling coil providing a highly concentrated magnetic field which induces eddy currents in a conductive article which is to be heated. In a device of this sort, it is desirable that the high frequency energy be supplied to the coupling coil only when the coupling coil is brought into association with the work to be heated, this being desirable not only to avoid overheating of the heating device, but also to conserve power.

The primary object of my present invention is to provide an improved control system for controlling the supply of energy from the high frequency oscillation generator to the coupling coil.

More particularly, it is an object of my present invention to provide an improved arrangement for controlling the output of the high frequency oscillation generator which will utilize as much of the high frequency coupling circuit which couples the generator to the heating device as is feasible for also supplying low frequency energy from a suitable low frequency power source to a control device which controls the supply of low frequency energy from the same power source for energizing the generator.

Another object of my present invention is to provide, in an improved arrangement as above set forth, a control element on the heating device which can be readily utilized by the operator to effect energization of the high frequency generator at a remote point.

It is also an object of my present invention to provide a control arrangement of the type set forth which can be readily adapted to existing heating devices, and which is highly efficient in use.

In accordance with my present invention, I employ a high frequency vacuum tube oscillator having a plate transformer coupled to the plates or output electrodes of the vacuum tubes, a relay-operated switch being provided in series with the primary winding of the transformer and in the circuit which provides connection of the plate transformer to a suitable low frequency power source. The output of the oscillator is connected to the primary winding of the transformer of the heating device through a suitable coupling circuit which delivers high frequency energy from the oscillator to the heating device. This circuit includes a capacitor in series with the primary winding of the heating device transformer. The relay, which controls the aforementioned switch for connecting the plate transformer to the power source, is connected in series with a suitable choke coil and the primary winding of the heating device transformer. A manually operable switch is also included in shunt relation with the aforementioned capacitor.

The high frequency coupling circuit between the oscillator and the heating device includes a portion which also carries the low frequency current from the power source through the relay, and this common portion or path in both the high frequency and the low frequency circuits may be a two-conductor cable which connects the heating device to both the oscillation generator and the control relay therefor at a remote point. In operation, the operator merely brings the inductor coupling coil up against the work to be heated and closes the aforementioned manually operable switch, whereupon the relay is energized to close the input circuit to the plate transformer and thereby cause the plate circuit of the oscillator to be energized to supply high frequency energy to the heating device. Upon release or opening of the manually operable switch, the relay becomes de-energized or inactive to thereby open the circuit from the power source to the plate transformer, thus stopping the flow of current from the oscillator to the heating device.

The novel features that I consider characteristic of my invention are set forth with particularity in the appended claims. The invention itself, however, both as to its organization and method of operation, as well as additional objects and advantages thereof, will best be understood from the following description, when read in connection with the accompanying drawing in which Figure 1 is a wiring diagram illustrating one form of my invention, Figure 2 is a partly structural and partly diagrammatic view showing one arrangement of switch device and control member therefor which may be mounted on the heating device in accordance with my present invention, and Figure 3 is a fragmentary, detail, sectional view illustrating another form and location of switch device on the heating unit in accordance with my present invention.

Referring more particularly to the drawing, wherein similar reference characters designate corresponding parts throughout, there is shown, in Fig. 2, a supporting tube 1 of insulating material on which is wound the primary winding 3 of a transformer coupled to a suitable radio frequency oscillation generator 5 by a suitable two-conductor cable 7. Surrounding the primary winding 3 and spaced therefrom is a single-turn secondary winding 9 to which is connected a frusto-conical coupling coil 11 constituting an inductor tip for heating the work, such as a rivet 13, as more fully described in my aforementioned copending application. To effect proper cooling of the windings 3 and 9 and also the inductor tip 11, there is formed on the end of the secondary winding 9 adjacent to the inductor tip 11 a radially inwardly extending tubular member 15 through which extends, radially in an outward direction, the nozzle end of a hose 17 through which compressed air may be passed. This construction is also disclosed in greater detail in my aforementioned application and is not believed to require further description at this point.

The oscillation generator 5 includes one or more vacuum tube oscillators 19 to the plates or output electrodes of which is connected a transformer 21. Connection of the primary winding of the plate transformer 21 may be made to a suitable low frequency power source through a master switch 23 and a relay-operated switch 25. Also connected to the same power source through a transformer 27 are the filaments of the tubes 19. The transformer 27 includes a secondary winding 29 which will be referred to more fully hereinafter.

The output of the oscillator 5 includes a tank circuit comprising a parallel connected capacitor 31 and inductor 33, the latter being connected in series with the primary winding 3 of the heating device transformer by the conductor 7a of the cable 7. A capacitor 35 is also provided in series with the winding 3 and is connected to ground through the lead 7b of the cable 7.

The switch 25 is controlled by a relay having a winding 37 in series with the secondary winding 29 of the transformer 27, whereby the winding 37 is also coupled to the low frequency power source, the armature of the relay being constrained to the open position of the switch 25 by a suitable spring 39. The relay 37 is arranged in series with a suitable choke coil 41, the inductor 33, the primary winding 3 and a manually operable switch 43 which is shunted across the blocking capacitor 35. If desired, a by-pass capacitor 45 may be shunted across the input of the low frequency circuit of which the relay 37 is a part and connected therein at the junction of the relay winding 37 and the choke coil 41.

The high frequency coupling circuit between the oscillator 5 and the primary transformer winding 3 is constituted by the ground connection at the filaments of the tubes 19, the filaments of these tubes, the plates of these tubes, the inductor 33, the conductor 7a, the primary winding 3, the capacitor 35 (particularly when the leads to the switch 43 are longer than approximately two inches and the oscillator 5 is operated at about 400 kc.), the conductor 7b, and ground. The low frequency circuit of the relay 37 is constituted by the ground connection at one end of the secondary winding 29, the secondary winding 29, the relay winding 37, the choke coil 41, the inductor 33, the conductor 7a, the primary winding 3, the switch 43, the conductor 7b, and ground. It will thus be seen that the inductor 33, the cable 7 with its two conductors 7a and 7b, and the primary winding 3 constitute a common path in both the high frequency and the low frequency circuits heretofore described.

Normally, the switches 25 and 43 are both open and the relay 37 is inactive. Upon closure of the master switch 23, the circuit to the filaments of the tubes 19 is completed and the filaments become hot. However, no energy is delivered to the heating device because the relay switch 25 is open. The operator brings the inductor tip up against the work and then closes the switch 43, whereupon the circuit of the relay 37 is completed and the relay is energized to close the switch 25. Thereupon, voltage is applied to the plates of the tubes 19 through the transformer 21 since power is being delivered from the power source to the primary winding of the transformer 21, and the high frequency current is supplied to the heating device. High frequency current will now flow through the circuit including the capacitor 35, and the low frequency current will flow through the circuit including the switch 43. The capacitor 35 normally blocks out the low frequency current when the switch 43 is open but passes radio frequency current when the switch 43 is closed. The choke coil 41 attenuates the high frequency current from the generator 5. If any of the high frequency current should pass down through the choke coil 41, it will be by-passed to ground through the capacitor 45 and thus prevented from passing through the relay 37. When the switch 43 is released or opened, the relay circuit is broken, the armature of the relay 37 is restored to normal position by the spring 39 thereby opening the switch 25, and the generator is again inoperative to deliver energy to the heating device.

For ease in manipulation, the heating device may be provided with a handle 47 on which is pivotally carried a manually operable control lever 49. The switch 43 may be mounted on the tube 1, for example, in proximity to the handle 47 and connected to the lever 49 by a link 51, as shown in Fig. 2. It will be obvious that, by merely pressing against the lever 49 with the fingers, the operator can easily close the switch 43, while release of pressure on the lever 49 will open the switch. In the arrangement shown in Fig. 3, the switch 43 may be mounted at the forward end of the inductor coil or tip 11 and provided with a spring actuated plunger 53 which may be brought into contact with the work 55 to effect closing of the switch. Various other similar arrangements may also be provided as will, no doubt, be apparent to those skilled in the art.

Thus the invention provides a novel and simple control of the oscillator for drawing current therefrom only at such time as the inductor tip is in proximity to the work, or at the will of the operator. Although I have shown and described but one circuit arrangement and two ways of mounting the manually operable switch on the heating device, it will be apparent that other modifications and arrangements are also possible. For example, if found expedient, the relay 37 and its switch 25 may be eliminated and the switch 43 connected directly to the primary circuit of the plate transformer 21. Other similar changes will, no doubt, readily suggest themselves. I therefore desire that my invention shall not be limited except insofar as is made necessary by the prior art and by the spirit of the appended claims.

I claim as my invention:

1. In an electrical heating system, the combination of a high frequency oscillation generator having a supply circuit including a switch, a low frequency control circuit including means for controlling said switch, said circuits having input terminals for connection of both said generator and said control circuit to a low frequency power source, a heating device, a circuit coupling said generator to said heating device for delivering high frequency energy to said device from said generator when said generator is energized from said source, said coupling circuit and said control circuit including a common path, and a switch device connected in said low frequency circuit for controlling operation of said control means.

2. In an electrical heating system, the combination of a high frequency oscillation generator having a supply circuit including a normally open switch, a low frequency control circuit including a relay for controlling said switch, said circuits having input terminals for connection of both said generator and said control circuit to a low frequency power source, a heating device, a circuit coupling said generator to said heating device for delivering high frequency energy to said device from said generator when said generator is energized from said source, said coupling circuit and said control circuit including a common path, and a switch device connected in said low frequency circuit external to said common path for controlling operation of said relay to effect closing of said switch and consequent energization of said generator.

3. The invention set forth in claim 2 characterized in that said switch device is carried by said heating device.

4. The invention set forth in claim 2 characterized in that said input terminals are common to both said generator supply circuit and said low frequency control circuit.

5. In an electrical heating system, the combination of a high frequency oscillation generator having a supply circuit including a switch, a low frequency control circuit including means for controlling said switch, said circuits having input terminals for connection of both said generator and said control circuit to a low frequency power source, a heating device including a transformer having a primary winding, a circuit coupling said generator to said primary winding for delivering high frequency energy to said device from said generator when said generator is energized from said source, said low frequency circuit having a common path with at least a portion of said coupling circuit and said common path including said primary winding, said coupling circuit including a capacitor in series with said winding and external to said common path for passing high frequency current, and a second switch in said low frequency circuit external to said common path for controlling operation of said control means, said second switch being shunted across said capacitor for by-passing low frequency current around said capacitor when closed.

6. In an electrical heating system, the combination of a high frequency oscillation generator having a supply circuit including a switch, a low frequency control circuit including means for controlling said switch, said circuits having input terminals for connection of both said generator and said control circuit to a low frequency power source, a heating device including a transformer having a primary winding, a circuit coupling said generator to said primary winding for delivering high frequency energy to said device from said generator when said generator is energized from said source, said low frequency circuit having a common path with at least a portion of said coupling circuit and said common path including said primary winding, and said low frequency circuit also including a choke coil in series with said winding and a switch for controlling operation of said control means, said last named switch also being in series with said winding and said choke coil being external to said common path.

7. In an electrical heating system, the combination of a high frequency oscillation generator having a supply circuit including a switch, a low frequency control circuit including means for controlling said switch, said circuits having input terminals for connection of both said generator and said control circuit to a low frequency power source, a heating device including a transformer having a primary winding, a circuit coupling said generator to said primary winding for delivering high frequency energy to said device from said generator when said generator is energized from said source, said low frequency circuit having a common path with at least a portion of said coupling circuit and said common path including said primary winding, said coupling circuit including a capacitor in series with said winding and external to said common path for passing high frequency current, and said low frequency circuit including a choke coil and a switch for controlling operation of said control means, said choke coil and said last named switch being both in series with said winding and external to said common path, and said last named switch being shunted across said capacitor for by-passing low frequency current around said capacitor when closed.

8. The invention set forth in claim 7, characterized in that said first and second named switches are both normally open, and characterized further in that the means for controlling said first named switch comprises a normally inactive relay having a winding in series with said second named switch, said relay winding becoming energized upon closing of said second named switch and being so arranged that, upon being energized, said relay will close said first named switch to effect energization of said generator.

9. A system according to claim 7 characterized by the addition of a second capacitor shunted across said low frequency circuit at the terminal of said choke coil remote from said winding.

10. A heating system according to claim 1 characterized in that said heating device includes a handle, and characterized further by the addition of means on said handle for operating said switch device.

11. A heating system according to claim 1 characterized in that said heating device is of the inductive heating type and includes an inductor coupling coil, and characterized further in that said switch device is mounted on said coupling coil and includes a member adapted to be actuated when said coil is brought into contact with the work to be heated to effect closing of said switch device.

12. In an electrical heating system, the combination of a high frequency vacuum tube oscillator including at least one vacuum tube, a plate supply circuit for the plate of said tube, said plate supply circuit including a switch, a low frequency control circuit including a relay for controlling said switch, said supply circuit and said control circuit having common input terminals for connection of both said generator and said control circuit to a low frequency power source, a heating device including an inductor coupling coil adapted to be applied to the work to be heated and a current transformer coupled to said inductor coupling coil, said transformer including a primary winding, a circuit coupling said generator to said primary winding for delivering high frequency energy to said heating device from said generator when said generator is energized from said source, said low frequency circuit and said coupling circuit including a common path and said common path including said primary winding, said coupling circuit including a capacitor in series with said winding and external to said common path for passing high frequency current, and said low frequency circuit including a choke coil and a switch for controlling operation of said relay, said choke coil and said last named switch being both in series with said primary winding and being both external to said common path, and said last named switch being shunted across said capacitor for bypassing low frequency current around said capacitor when closed.

HENDERSON C. GILLESPIE.